US006549565B1

(12) United States Patent
Buehrer et al.

(10) Patent No.: US 6,549,565 B1
(45) Date of Patent: Apr. 15, 2003

(54) CODE DIVISION MULTIPLE ACCESS SYSTEM AND METHOD OF OPERATION WITH IMPROVED SIGNAL ACQUISITION AND PROCESSING

(75) Inventors: R. Michael Buehrer, Morristown, NJ (US); Shang-Chieh Liu, Dover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/455,947

(22) Filed: Dec. 7, 1999

(51) Int. Cl.[7] .................................................. H04J 13/04

(52) U.S. Cl. ....................... 375/142; 375/144; 375/148; 375/150

(58) Field of Search ................................ 375/140, 142, 375/144, 147, 148, 150; 370/342, 479

(56) References Cited

U.S. PATENT DOCUMENTS

| | | | | |
|---|---|---|---|---|
| 4,894,842 | A | | 1/1990 | Broekhoven et al. ........... 375/1 |
| 5,500,856 | A | | 3/1996 | Nagase et al. ................. 375/18 |
| 5,568,473 | A | | 10/1996 | Hemmati ..................... 370/18 |
| 5,724,485 | A | | 3/1998 | Rainton ........................ 395/20 |
| 5,822,380 | A | | 10/1998 | Bottomley ................... 375/347 |
| 5,832,044 | A | | 11/1998 | Sousa et al. ................. 375/347 |
| 5,848,105 | A | | 12/1998 | Gardner et al. ............. 375/336 |
| 5,870,378 | A | | 2/1999 | Huang et al. ................ 370/209 |
| 5,872,776 | A | | 2/1999 | Yang .......................... 370/342 |
| 5,878,076 | A | | 3/1999 | Siedenburg ................. 375/206 |
| 5,881,099 | A | | 3/1999 | Takahashi et al. .......... 375/206 |
| 5,905,721 | A | | 5/1999 | Liu et al. .................... 370/342 |
| 5,918,154 | A | | 6/1999 | Beasley ...................... 455/11.1 |
| 6,411,186 | B1 | * | 6/2002 | Lilleberg et al. ............ 335/252 |
| 6,449,266 | B1 | * | 9/2002 | Hottinen et al. ............ 370/342 |

OTHER PUBLICATIONS

"New Array Processing Algorithms for Maximizing Capacity of Multi–Media Spread–Spectrum Multi–access Communications", F Fruth et al., Advanced Telecommunications / Information distribution research Program (ATIRP) 1st Annual conference Jan. 21 & 22, 1997.

* cited by examiner

Primary Examiner—Amanda T. Le
(74) Attorney, Agent, or Firm—Morgan & Finnegan LLP

(57) ABSTRACT

A Code Division Multiple Access system and method of operation provides reduced interference for received signals and improved signal acquisition and processing with reduced computational complexity. The system includes a base station coupled to an antenna array of at least two or more antennas and serving a plurality of users. A receiver in the base station includes a universal inverse cross-correlation matrix coupled to the antenna array, a signal acquisition and a signal processing circuit serving each user. Each signal acquisition circuit comprises a series of delay stages in which the incoming antenna signals in each stage are correlated with a spreading code and combined in a multiplier coupled to the universal inverse cross-correlation matrix which facilitates improved time delay estimation for signal acquisition. Each multiplier combines the correlated signals of the stage with the output of the universal inverse cross-correlation matrix to provide a signal amplitude representative of the signal energy in an antenna path for a given time period, with individual delays separated by a half of chip period. The amplitudes for each of the delay stages are captured in buffers which contain threshold information for selection of the strongest received signal. The signal processing circuit combines the strongest received signal with a channel estimate and the universal inverse matrix output in a multiplier to provide an output signal for demodulation and decoding with improved signal quality due to (a) reduced interference, (b) improved synchronization for signal acquisition and processing, and (c) the universal inverse cross-correlation matrix reducing computational complexity in signal acquisition and signal processing.

15 Claims, 6 Drawing Sheets

CODE DIVISION MULTIPLE ACCESS SYSTEM AND METHOD OF OPERATION WITH IMPROVED SIGNAL ACQUISITION AND PROCESSING

BACKGROUND OF INVENTION

1. Field of Invention

This invention relates to wireless systems using Code Division Multiple Access (CDMA) systems and methods of operation. More particularly, the invention relates to wireless CDMA systems which employ multiple antennas at the receiver.

2. Description of Prior Art

In CDMA systems, any processing at the receiver that reduces interference improves link quality in terms of reduced noise and system capacity in terms of increased numbers of users (termed mobiles) served by the system. Interference reduction is thus an important objective for CDMA systems. However, before signal processing can occur in a CDMA receiver, the timing of each received signal must be accurately estimated to allow despreading to occur. The process of estimating the timing of each received signal is termed synchronization. Previously proposed signal processing methods which reduce interference assume that synchronization has been accomplished prior to processing. However, estimating the time delay for all received signals becomes more difficult due to the increased interference as the number of received signals increase.

One signal processing method which reduces interference and increases system capacity in CDMA systems is the use of multiple antennas or antenna arrays. Antenna arrays can provide diversity reception (termed diversity gain) as well as improvement in average Signal-to-Noise Ratio (termed aperture gain) to make the wireless link more robust in the presence of multipath fading. Antenna arrays can also achieve interference rejection (Signal-to-Interference-Plus-Noise or SINR gain) through appropriate antenna combining. Capacity improvement is accomplished by combining the weighted outputs of each antenna in a way that cancels the interference and/or enhances the desired signal. The weights are computed (and tracked in real time if necessary) according to an optimization criterion and an associated adaptive algorithm. Typical algorithms require an estimate of an antenna cross-correlation matrix for each signal being received. The cross-correlation matrix contains information concerning the interfering signals (e.g., power and angle-of-arrival) which is useful in calculating the appropriate antenna weights to reduce the interference. In CDMA systems, the cross-correlation matrix is typically formed using post-correlated signals (i.e., after despreading), since estimating the matrix before correlation (pre-correlation) involves calculating vector outer products at the chip rate which requires high-speed computation. On the other hand, calculating the post-correlated cross-correlation matrix requires synchronization to occur previously, which again requires improved signal acquisition techniques. What is needed in the art is a CDMA system and method of operation which provides an improved synchronization technique for interference reduction in signal acquisition and has reasonable computational complexity in processing pre-correlated signals.

Prior art related to reducing interference in CDMA systems includes the following:

U.S. Pat. No. 5,500,856 entitled "Transmission De-Correlator For Eliminating Interference In A CDMA Communication System", issued Mar. 19, 1996 discloses a transmission de-correlator having a memory storing a set of data representative of the products of transmission information bits for the respective channels, and the sums of the products of the spread code data sequence for the respective channels, and the elements of an inverse matrix with respect to a predetermined matrix of a cross-correlation between the spread code data sequences for the respective channels. The sums correspond to additions of the products along a direction of rows of the inverse matrix. A counting device is operative for causing the memory to sequentially output the data therefrom. An adder serves to calculate a sum of the data outputted from the memory for the respective channels.

U.S. Pat. No. 5,568,473 entitled "Method And Apparatus For Simple And Efficient Interference Cancellation For Chip Synchronized CDMA", issued Oct. 22, 1996 discloses canceling interference from other users by constructing a single reference sequence which is representative of the spreading sequences of all users in the system. Interference from other users can be cancelled without each receiver employing a separate decorrelator for every other user in the system and having an accurate estimate of the received power level of every transmitted signal.

None of the prior art discloses CDMA systems and methods of operation using antenna arrays with improved synchronization for interference reduction in signal acquisition and reasonable computational complexity for both signal acquisition and signal processing.

SUMMARY OF THE INVENTION

An object of the invention is a CDMA system and method of operation using one or more antenna arrays for interference reduction and having improved signal acquisition and signal processing with reasonable computational complexity.

Another object is a receiver and method of operation having improved synchronization for signal acquisition and signal processing in a CDMA system including one or more antenna arrays.

Another object is a receiver and method of operation in which a universal inverse cross-correlation matrix is used in both signal acquisition and signal processing for reduced computational complexity in a CDMA system including one or more antenna arrays.

Another object is a receiver and method of operation in which a universal inverse cross-correlation matrix array facilitates synchronization in signal acquisition and reduced computational complexity for both signal acquisition and signal processing in a CDMA system having one or more antenna arrays.

These and other objects, features and advantages of the invention are achieved in a Code Division Multiple Access system and method of operation which provide reduced interference for received signals and improved signal acquisition and processing with reduced computational complexity. The system includes a base station coupled to an antenna array of at least two or more antennas and serving a plurality of users. A receiver in the base station includes a universal inverse cross-correlation matrix coupled to the antenna array, a signal acquisition and a signal processing circuit serving each user. Each signal acquisition circuit comprises a series of delay stages in which the incoming antenna signals in each stage are correlated with a spreading code and combined in a multiplier coupled to the universal inverse cross-correlation matrix which facilitates improved time delay estimation for signal acquisition. Each multiplier combines the correlated signals of the stage with the output of the universal inverse cross-correlation matrix to provide a signal amplitude representative of the signal energy in an antenna path for a given time period, with individual delays separated by a half of chip period. The amplitudes for each of the delay stages are captured in buffers which contain threshold information for selection of the strongest received signal. The signal processing circuit combines the strongest received signal with a channel estimate and the universal inverse matrix output in a multiplier to provide an output signal for demodulation and decoding with improved signal quality due to (a) reduced interference, (b) improved time delay estimation for signal acquisition and processing, and (c) the universal inverse cross-correlation matrix reducing computational complexity in signal acquisition and signal processing.

DESCRIPTION OF THE DRAWINGS

The invention will be further understood from the following detailed specification taken in conjunction with the appended drawings, in which.

DESCRIPTION OF PREFERRED EMBODIMENT

Briefly, the present invention seeks to create a receiver and method of operation in a CDMA system in which the receiver includes a universal cross-correlation matrix (i.e., a cross-correlation matrix which can be used for all user signals) from pre-correlated signals that is used to improve synchronization as well as improving system capacity through interference reduction. Additionally, since a single or universal matrix array can be used for all user signals arriving at the base station, the complexity of the method is reasonable.

The universal array processing method involves correlating the received samples on each antenna to create a common or universal correlation matrix. The universal matrix is inverted and applied to the received samples with the result being used to estimate proper signal timing (i.e., synchronization) for each of the desired signals. The processing provides more robust synchronization than conventional synchronization methods since it reduces the interference in the signals used for synchronization. Additionally, after synchronization and correlation, the universal array matrix is used for processing each of the post-correlated signals. This post-correlation processing reduces the interference seen by each user signal at detection thus improving the system capacity. Also, by using a common array the processing complexity of the invention is reduced with respect to prior CDMA systems and receivers.

Figure 1:
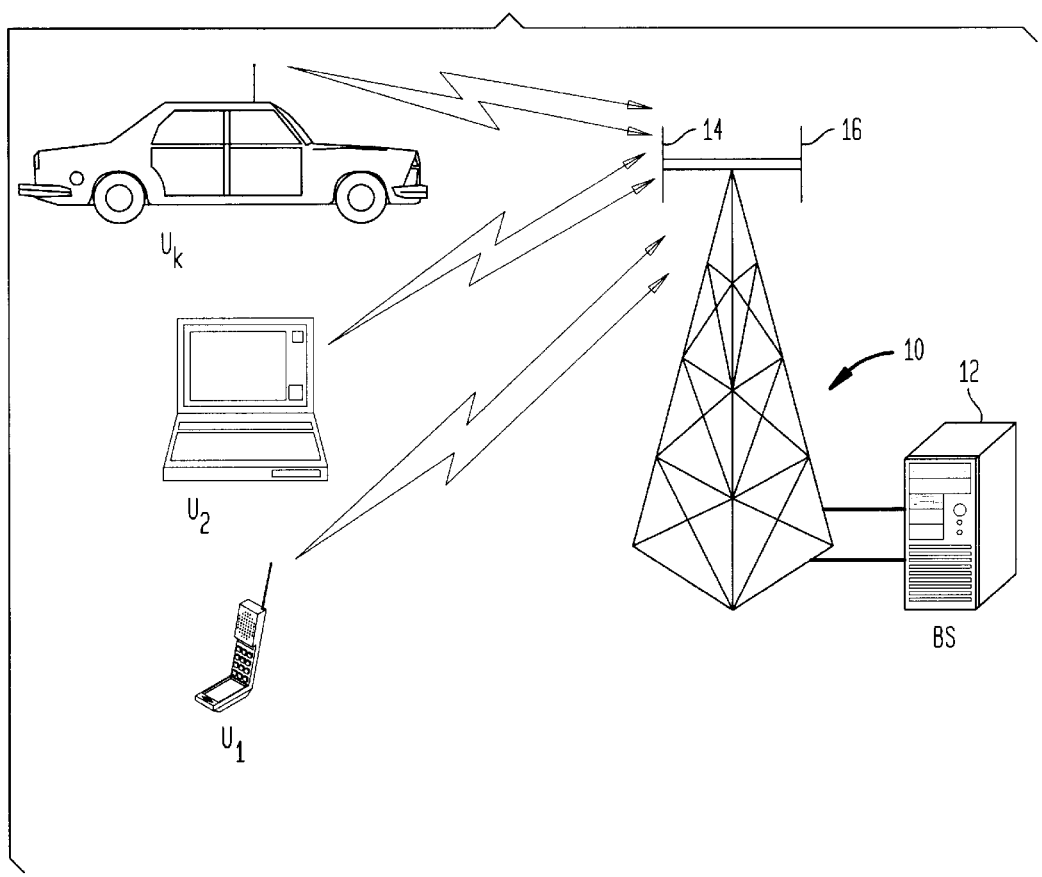
FIG. 1 is a representation of a base station in a CDMA system coupled to multiple antennas serving plural users.

In FIG. 1, a CDMA system 10 includes a base station 12 linked to multiple users (e.g., user 1; user 2; up to user K ($U_1$–$U_k$)) through multiple antennas 14, 16. While FIG. 1 shows only two antennas, the invention applies to any number of antennas at the base station.

Figure 2:
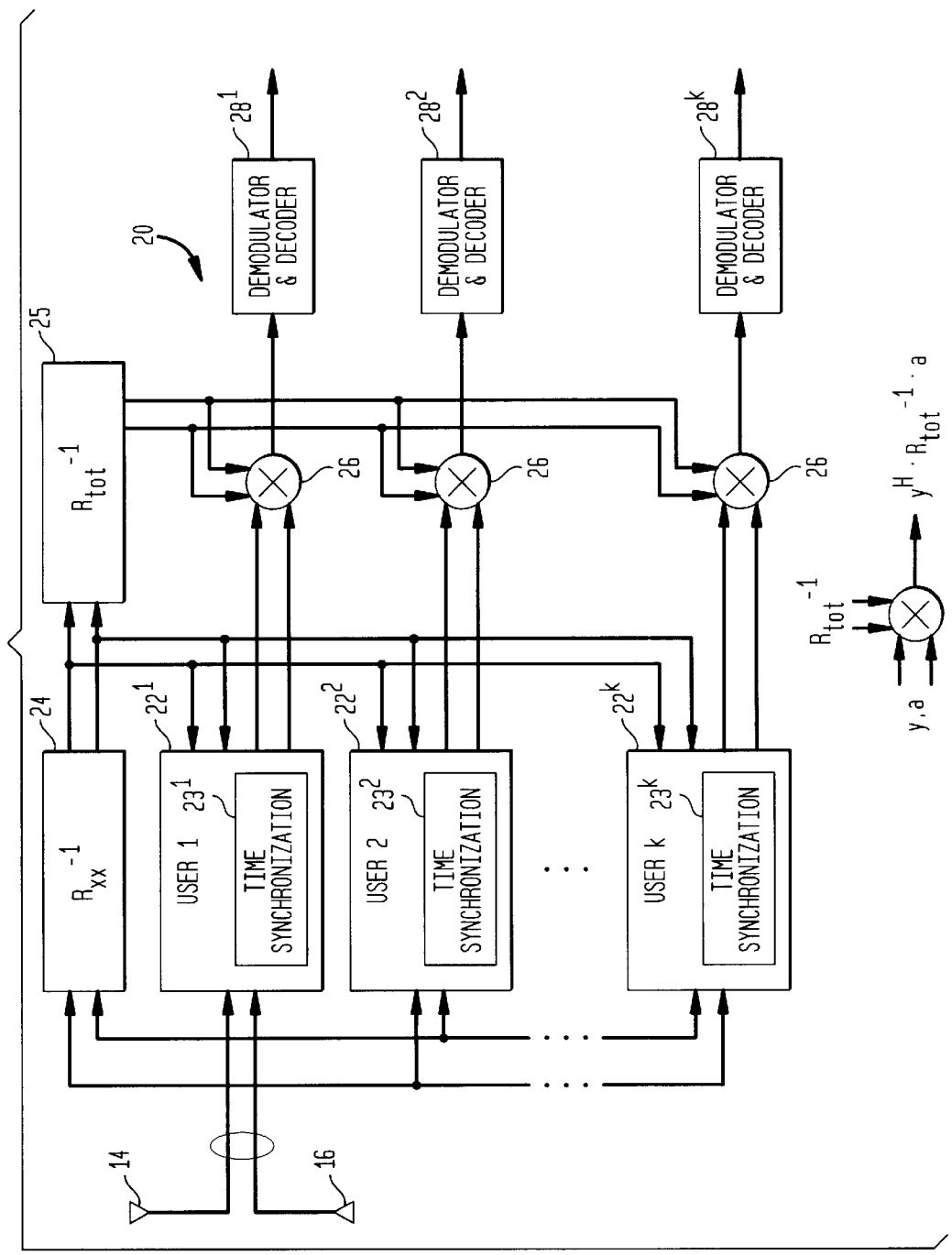
FIG. 2 is a block diagram of a receiver in the base station of FIG. 1 and incorporating the principles of the present invention.

In FIG. 2, a receiver 20 in the base station 12 includes signal processing circuits $22^1 \cdots 22^k$ for users 1, 2 . . . K, coupled to the antennas 14 and 16. Each of the signal processing circuits contains synchronization circuits $23^1 \ldots 23^k$. All of the user signals see a similar interference environment as they all use the same frequency band and the same receive antennas. Thus, there exists for the user signals a universal interference matrix 24, which represents the interference subspace of all user signals. Accordingly, the matrix 24 can be used for improved synchronization as well as the inputs of block 25 for the array processing of all user signals instead of conventional individual processing. The matrix is the cross-correlation matrix of all the antenna inputs. It can be shown that if there are any interfering signals that are very large, the inverse matrix method will reduce their value and improve the quality of the signal to be used for synchronization and detection processing. The process of calculating the inverse matrix coefficients will be described hereinafter in conjunction with FIG. 4.

The output of block 24 is the inverse of the cross-correlation matrix $R_{xx}$ and is input to block 25 to create $R^{-1}_{tot}$. The function of block 25 will be explained in conjunction with FIG. 4. The output of block 24 is also sent to the synchronization circuits $23^1 \ldots 23^k$. The synchronization circuits will be explained in conjunction with FIGS. 3 and 5. The outputs of the signal processing circuits $22^1 \ldots 22^k$ are combined with the output of the inverse matrix 25 in a multiplier 26 as shown by the mathematical relationship at the bottom of FIG. 2 and provided to standard demodulator and decoder circuits $28^1 \ldots 28^k$. Before describing the signal processing in which the post-correlated signals y are combined with a channel estimate for processing by the demodulators and decoders 28, it is appropriate to describe the synchronization circuits 23 shown in FIG. 3.

Figure 3:
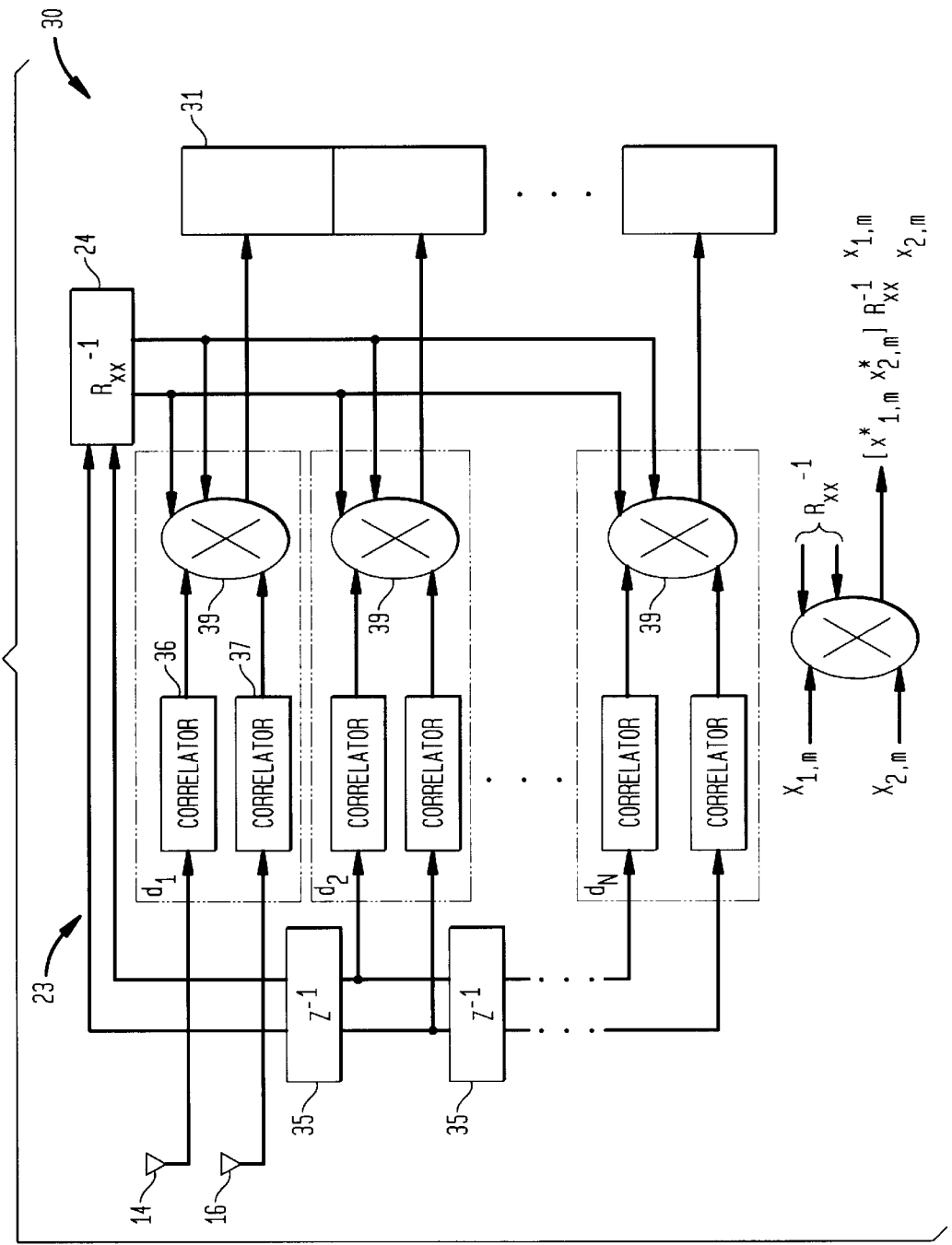
FIG. 3 is a block diagram of a signal synchronization circuit in the signal processing circuit of FIG. 2 and incorporating the principles of the present invention.

In FIG. 3, the signal acquisition circuit 23 for each User 1, 2 . . . K comprises a series of delay stages d1, d2 . . . dN separated by delay elements 35, each delay element typically being a half chip delay. Each delay stage is comprised of correlators 36 and 37 (i.e., equal to the number of antenna elements) and one summer/multiplier 39. The antennas 14 and 16 are coupled to correlators 36, 37 (each correlator correlates with the in-phase and quadrature signals) in each delay stage. The correlators correlate the spreading code of the user and the received signal samples, and are well known in the art. The spreading code is known by the correlator but the phase and the timing of the signal of interest are unknown. The acquisition circuit 23 receives incoming sample streams from each antenna which are correlated with the spreading code and combined in a multiplier 39 with the inverse matrix coefficients to provide an output to a storage buffer 31 indicative of the signal energy for that delay period. The mathematical relationship of the operation which takes place in multiplier 39 is given at the bottom of FIG. 3. The storage buffer 31 contains threshold information which allows it to determine the presence of the signal in any of the delays. The choice of threshold is a system design parameter. The process of calculating the energy for a single time delay will be described in further detail in conjunction with FIG. 5.

Figure 4:
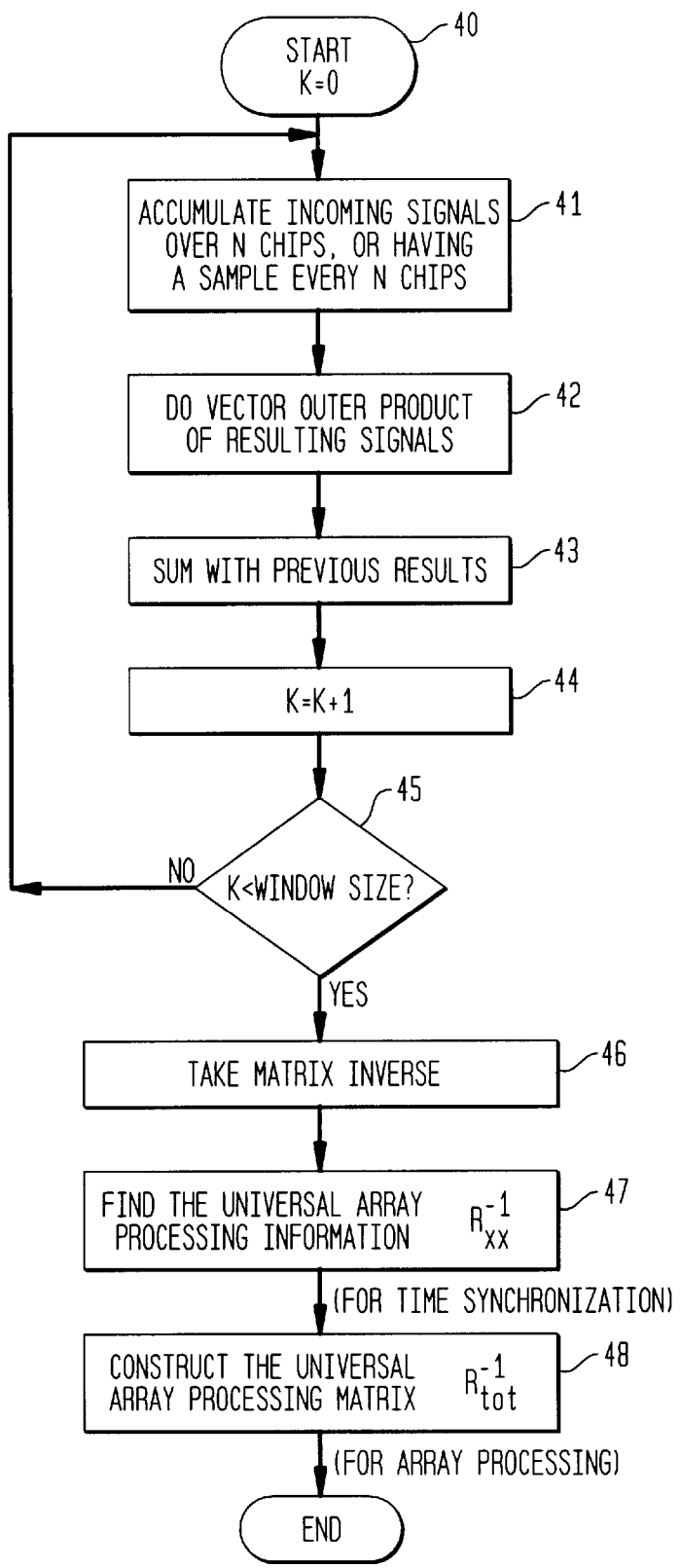
FIG. 4 is a flow diagram for calculating the coefficients of inverse matrices included in FIGS. 2 and 3.

Returning to FIG. 2, the process of calculating the inverse matrix coefficients (blocks 24 and 25) will now be described in conjunction with FIG. 4. In FIG. 4 the process of calculating the inverse matrix coefficients begins in block 40 in which an index K is set to zero where K is the number of vector outer products which are averaged to create the cross-correlation matrix. In block 41 the incoming signals from the antennas 14 and 16 are accumulated in a register (not shown) over N chips (i.e., the symbols of the spreading code) or simply sampled every N chips. The first option requires more computation but will have a better signal-to-noise ratio. A vector outer product is calculated from the resulting signals in block 42. If M is the number of antennas, the vectors are M×1 and the result of the outer product is M×M. The outer products are summed with previous results (if K>1) in block 43. The index K is increased by 1 in block 44. In block 45, a test is performed to determine if the value of K is larger than the predetermined window size. The window size should be chosen to be larger than the number of antennas for proper performance. If K+1 is less than the window size, the process is returned to block 40 for another iteration and K is updated for the next calculation. Once the number of K iterations equals the window size, the matrix is inverted in block 46 and the result is passed to the synchronization circuit as well as step 48. The process of inverting a matrix is well known and described in the text *Matrix Computations* by Golub and Van Loan, published by The John Hopkins University Press, Baltimore and London, 1989, pages 142–154. Block 48 calculates the larger matrix $R^{-1}_{tot}$ for signal processing according to $$R^{-1}_{tot} = \begin{matrix} R^{-1}_{rr} & 0 & \cdots & 0 \\ 0 & R^{-1}_{rr} & \cdots & 0 \\ \vdots & \vdots & \ddots & \vdots \\ 0 & 0 & \cdots & R^{-1}_{rr} \end{matrix}$$

The dimensions of $R^{-1}_{tot}$ are ML×ML where M is the number of antennas and L is the maximum number of multipaths being tracked.

Figure 5:
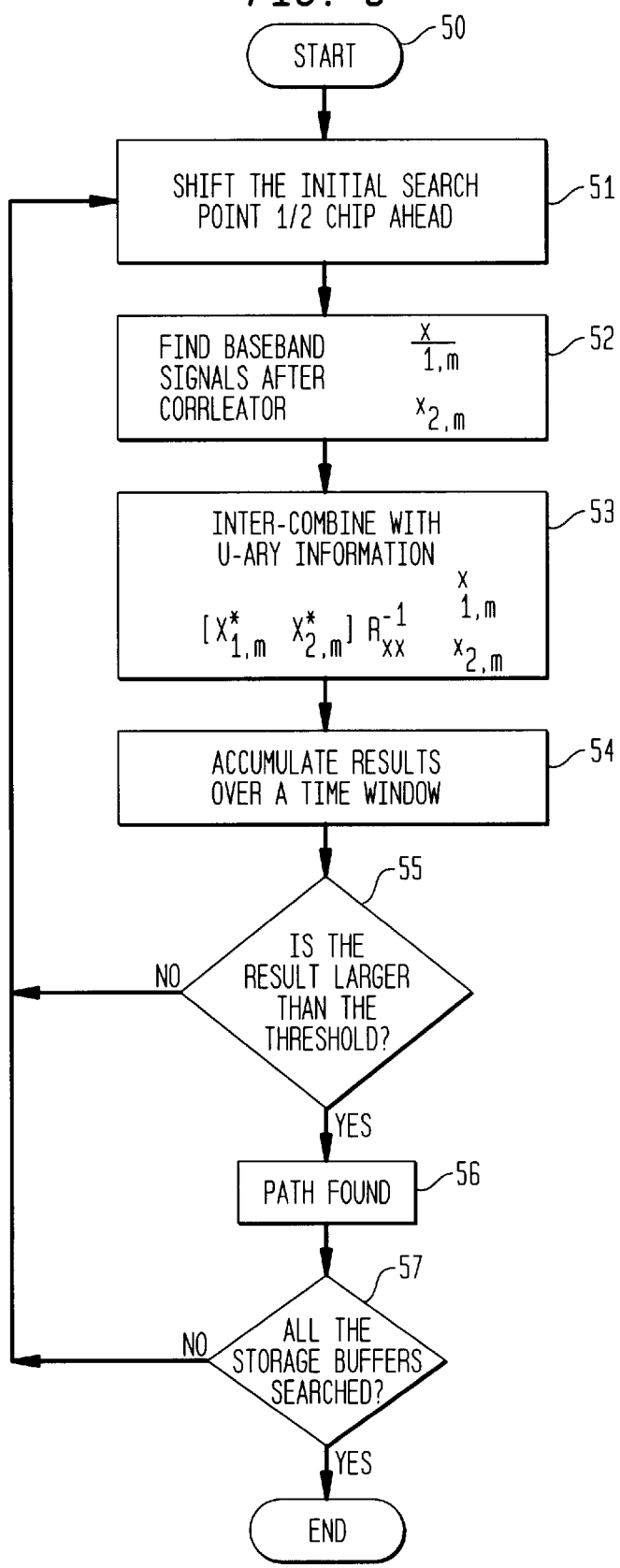
FIG. 5 is a flow diagram for calculating signal time delay in the signal acquisition circuit of FIG. 2.

The process of determining the input signal timing (i.e., synchronization) will now be described in FIG. 5 in conjunction with the signal acquisition circuit 23 shown in FIG. 3. At start 50 a sample point in time is determined to begin the synchronization process. In block 51, the search point is moved one-half chip ahead. (This is represented as a one-half chip delays 35 in FIG. 3. The delay could be other than one-half of a chip and should be determined by the system designer.) In block 52, a signal sample from each antenna after correlation creates a 1 by $2^1$ matrix vector $[X_{1,m}, X_{2,m}]$ and in block 53, the same signal samples are used to create a second 2×1 matrix vector. The two vectors are used to pre-multiply and post-multiply the inverse of the $R_{xx}$ matrix as shown in Block 53 where ( )* represents the complex conjugate. The result of block 53 is accumulated in block 54 over a selected window size and stored in buffer storage 31 in FIG. 3. In block 55 the result in the buffer storage is compared to a threshold level representative of signal energy. The threshold is determined by the system engineer. If the signal energy is less than the threshold, the process is repeated until the threshold is exceeded or all delays have been searched. If the energy exceeds the threshold, a valid time delay of the received signal has been found and the synchronization process continues in block 57 until all delays have been searched.

[1]For two antennas. In general the vector will be 1 by M

Figure 6:
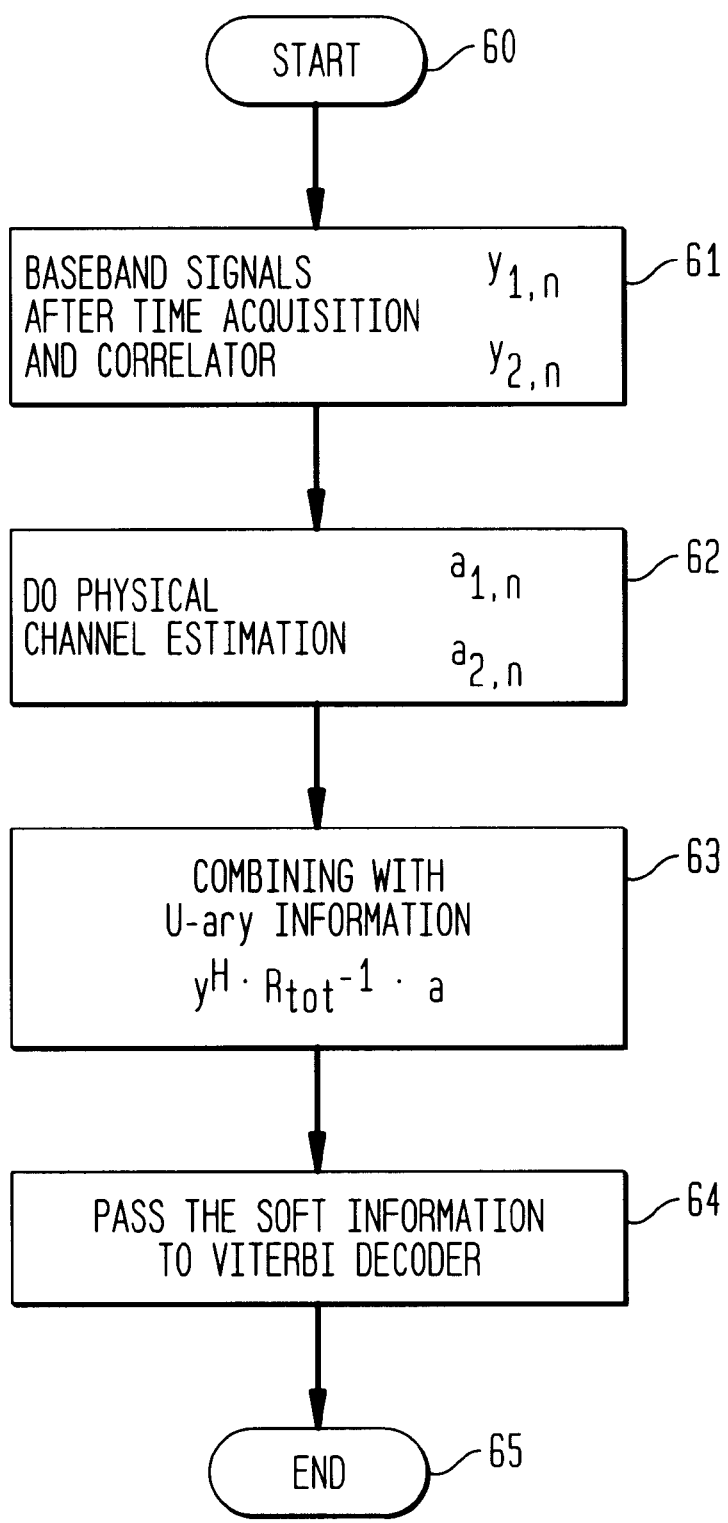
FIG. 6 is a flow diagram for processing signals in the signal processing circuit of FIG. 2.

After synchronization, signal processing takes place in the receiver 20 shown in FIG. 2, which will be described in conjunction with FIG. 6. At start 60, signal processing begins in block 61 in which the received signal is correlated with the spreading code using timing information obtained in synchronization circuits 23 to provide the post-correlated signals $y_{1,n}$ and $y_{2,n}$ for the antennas 14 and 16. These are expressed as a 1×2 matrix vector, $[y_{1,n}, y2, n]$ where n indicates the delay component (i.e., delayed version of the received signal) and provided to the multiplier 26. (Again it should be noted that in the general case of M antennas, the vector will be of dimensions 1×M.) In block 62, channel estimation is performed to obtain channel estimates for each antenna at each delay n, a1, n, and $a_{2,n}$. Channel estimation is performed to indicate the relative strength and phase of the channels at each delay and is expressed as a 2×1 matrix vector an=$[a_{1,n}a2, n]$. There are several alternatives for performing channel estimation. Ser. No. 09/296,654 filed May 1999, assigned to the assignee of the present invention is representative of one channel estimation compatible with the present invention and is fully incorporated herein by reference.

In block 63, the correlator outputs for each path on each antenna are combined to form a single vector y=$[y1Ty2T \ldots y_L^T]^T$ where $Y_n$ is the 2×1 vector for each delay $[y1, n\ y2, n]^T$. The multiplier 26 combines the antenna signals vector y with the channel estimate vector a=$[a1T\ a2T \ldots a_L^T]^T$ and the inverse matrix $R^{-1}_{tot}$. This multiplication is represented by the mathematical relationship given at the bottom of FIG. 2. The resulting signals for the users are provided in block 64 to the demodulators and Viterbi decoders as a combined output from the antennas (one for each receiver 22) with improved signal quality for the different users. The signal processing ends in step 65. Demodulation (or detection) and Viterbi decoding are well known in the art.

Summarizing, the present invention discloses a receiver and method of operation in a CDMA system having one or more antenna arrays for antenna diversity. The receiver includes a universal matrix array for processing both signal delay estimation (synchronization) and signal processing. Antenna diversity and universal matrix array processing improves synchronization and noise reduction in CDMA systems which increases the number of simultaneous users possible for such a system while reducing receiver circuit computational complexity with respect to prior art systems and methods.

While the invention has been shown and described in conjunction with the specific embodiment, various changes may be made without departing from the spirit and scope of the invention as defined in the appended claims in which.

We claim:

1. A receiver comprising:
   antenna means for receiving multiple signals
   a universal inverse cross-correlation matrix coupled to the received signals;
   means coupled to the universal inverse cross-correlation matrix and to the received signals for determining signal time delay of the received signals and providing a first output; and
   means coupled to the universal inverse cross-correlation matrix and to the first output providing an output signal having improved signal quality.

2. The receiver of claim 1 further comprising:
   means coupled to the antenna for correlating the received signals in delay periods; and
   means coupling delayed correlated received signals and the universal inverse cross-correlation means to provide the first output.

3. The receiver of claim 2 further comprising:
   means coupled to the first output for storing delayed correlated received signals by delay period; and
   means for selecting a delayed correlated received signal of maximum amplitude as the output signal.

4. The receiver of claim 3 further comprising:

means for demodulating and decoding the selected received signal of maximum amplitude as the output signal.

5. The receiver of claim 2 further comprising:

means coupled to the antennas for delaying the received signals in delay periods related to a chip rate.

6. A code division multiple access system, comprising:

a base station receiver coupled to at least two antennas and receiving signal samples having a spreading code and a chip rate;
    a signal acquisition circuit in the receiver responsive to the received signal samples;
    a signal processing circuit coupled to the signal acquisition circuit; and
    a universal inverse cross-correlation matrix coupled to both the signal acquisition circuit for improved time delay estimation and to the signal processing circuit in providing an output signal of improved signal quality.

7. The system of claim 6 further comprising:

means coupled to the antennas for delaying the received signal samples in delay periods to determine the received signal sample with maximum signal amplitude.

8. The system of claim 7 wherein the delayed received signal samples are stored in a buffer for selection of the received signal sample with maximum signal amplitude.

9. The system of claim 8 further comprising:

means for combining a delayed received signal sample with an output signal from the inverse cross-correlation matrix as an input to the signal processing circuit.

10. The system of claim 7 further comprising:

means coupled to the combining means for storing the delayed received signal samples.

11. The system of claim 10 further comprising:

means for determining the stored delayed received signal sample with maximum signal amplitude.

12. In a CDMA system including an antenna array; a signal acquisition circuit and a signal processing circuit coupled to a universal inverse cross-correlation matrix, a method of receiving signals having a spreading code and a chip rate and processing the received signals with improved synchronization for signal acquistion and processing purposes, comprising the steps of:

correlating received signal samples in delay periods and providing a first output for each delay period;

processing received signal samples in the universal inverse cross-correlation matrix and providing a second output;

combining the first and second output signals and providing a third output for each delay period to a storage means, providing from the storage means the third output which exceeds a threshold and has reduced noise interference due to improved synchronization; and processing the third output and the second output to obtain and an output signal of improved signal quality.

13. The method of claim 12 wherein the universal inverse cross-correlation matrix is constructed comprising the steps of:

a) setting an index Q to zero where Q is the number of vector outer products which are averaged to create a cross correlation matrix;

b) accumulating incoming received signals over N chips of the spreading code where N is a system design parameter;

c) calculating vector outer products of the received signals:

d) averaging the outer products signals over a sampling window;

e) setting Q to Q+1 and determining if Q is greater than Q+1;

f) forming a matrix inverse of the received signals if Q greater than Q+1 or returning to step b if Q less than Q+1; and g) constructing a universal inverse cross-correlation matrix for the received signals.

14. The method of claim 12 wherein combining the first and second outputs comprises the steps of a) shifting a delay period a selected amount for processing the third output;

b) creating a first vector and a second vector for the received signals;

c) multiplying the first and second vectors to obtain an inverse matrix which is the sum of the first and second vectors;

d) repeating steps a, b and c and accumulating results;

e) determining if the result of step d) is greater than the threshold; and g) returning to step a) if the threshold is not exceeded; and h) providing the third output as the combined output if the threshold is exceeded.

15. The method of claim 12 wherein processing the output signal comprises the steps of:

a) determining from the received signals a baseband as a vector after time acquisition and correlation;

b) estimating channel distortion of the received signals as a vector;

c) combining the baseband signal vector; channel estimate vector and the universal inverse cross correlation matrix as the output signal; and d) providing the output signal to a signal sink.

* * * * *